US012573775B1

(12) United States Patent
Worsham

(10) Patent No.: US 12,573,775 B1
(45) Date of Patent: Mar. 10, 2026

(54) SNAP ON TERMINAL BLOCK CONNECTOR

(71) Applicant: David Worsham, Santa Rosa Beach, FL (US)

(72) Inventor: David Worsham, Santa Rosa Beach, FL (US)

( * ) Notice: Subject to any disclaimer, the term of this patent is extended or adjusted under 35 U.S.C. 154(b) by 318 days.

(21) Appl. No.: 18/229,028

(22) Filed: Aug. 1, 2023

(51) Int. Cl.
*H01R 9/24* (2006.01)
*H01R 9/26* (2006.01)

(52) U.S. Cl.
CPC ......... *H01R 9/2416* (2013.01); *H01R 9/2408* (2013.01); *H01R 9/2608* (2013.01)

(58) Field of Classification Search
CPC .. H01R 9/2416; H01R 9/2608; H01R 9/2408; H01R 9/24
See application file for complete search history.

(56) References Cited

U.S. PATENT DOCUMENTS 3,315,215 A * 4/1967 Kulka .................. H01R 9/2408 439/550
4,790,763 A * 12/1988 Weber ................ H01R 12/7011 439/947
10,348,006 B2 * 7/2019 Reynolds ............. H01R 9/2608

FOREIGN PATENT DOCUMENTS

DE 10100081 B4 * 5/2010 ........... H01R 9/2408
DE 102020123187 A1 * 3/2022 ............. H01R 13/02

OTHER PUBLICATIONS

Grainger approved terminal strip; 14 AWG for Max Wire Size, 15 A Current, Terminal Strip—6ZEF6|6ZEF6—Grainger.

* cited by examiner

*Primary Examiner* — renee s luebke
*Assistant Examiner* — Paul D Baillargeon
(74) *Attorney, Agent, or Firm* — Lanier Ford Shaver & Payne, P.C.; Gerald M. Walsh

(57) ABSTRACT

A terminal block connector having a housing on a first side of a center support, one or more metal connectors on a top of the housing and guide rails beneath a bottom of the housing, each guide rail having a channel and a locking slot. A second side of the center support has a mounting plate near a bottom of the center support, with locking arms extending from the bottom of the center support and below the mounting plate. Free ends of the locking arms have locking hooks. The mounting plate is insertable in the guide rails of another terminal block connector and the locking hooks insert into locking slots of the another terminal block connector and to lock the terminal block connector to the another terminal block connector. An end terminal mount is connected to the housing of the terminal block connector.

20 Claims, 9 Drawing Sheets

SNAP ON TERMINAL BLOCK CONNECTOR

FIELD OF THE DISCLOSURE

This disclosure relates to terminal blocks for use with electrical equipment and, more particularly, to a single terminal block connector, a plurality of which can snap together removably to produce a terminal block with a desired number of terminal block connectors.

BACKGROUND OF THE DISCLOSURE

A terminal block is a modular, insulated block that secures two or more wires together. Factories use terminal blocks to secure and/or terminate wires. In their most basic form, terminal blocks consist of several individual terminals which are arranged in a long strip. Terminal blocks are used on industrial and power management electronic devices, such as variable frequency drives, motor protection relays, power and energy meters, power supplies and converters, HVAC and traffic controls, programmable logic controllers and many others. Electricians and other installers can quickly work with this simple form of equipment installation and electrical integration.

FIG. 1 shows a typical terminal block 1 with several circuits. Each circuit has a metal plate 2 with a pair of electrical connecting screws 3 and a barrier 4 between each circuit. There are mounting plates 5 on each end of the terminal block 1. The terminal block 1 has a closed back design that insulates power from the mounting surface of the terminal block. Terminal blocks such as these are sold with a fixed number of circuits. It would be more convenient if there were a single unit terminal block circuit that had snap on features so that several of these single terminal block circuits could be removably snapped together to form a closed back custom terminal block with an exact number of desired circuits.

SUMMARY OF THE DISCLOSURE

This disclosure describes a terminal block connector having a center support with a first side, a second side opposite the first side, a top and a bottom. The first side of the center support has a housing with a top and a bottom, one or more metal connectors on the top of the housing, and guide rails beneath the bottom of the housing, each guide rail having a channel and a locking slot. The second side of the center support has a mounting plate near the bottom of the center support, with locking arms extending from the bottom of the second side of the center support and below the mounting plate. Free ends of the locking arms have locking hooks, the mounting plate is insertable in the guide rails of another terminal block connector, and the locking hooks are constructed to insert into the locking slots of the another terminal block connector, locking the terminal block connector to the another terminal block connector.

Ends of the guide rails near the locking slots may be widened to compress the locking arms. The locking slots are at the bottom of the center support. The locking arms may be flexible horizontally and vertically. An end terminal mount may be connected to the housing of the terminal block connector.

The end terminal mount has a center support having a first side, a second side opposite the first side, a top and a bottom. The first side of the center support has a mounting plate and the second side of the center support has a guide plate near the bottom of the center support. Locking arms extend from the bottom of the second side of the center support and below the bottom of the mounting plate. Free ends of the locking arms have locking hooks. The guide plate is insertable in the guide rails of a terminal block connector and the locking hooks are constructed to insert into the locking slots of the terminal block connector and to lock the end terminal mount to the terminal block connector.

A plurality of terminal block connectors may be connected together with the locking hooks and the locking slots of each terminal block connector of the plurality of terminal block connectors, thereby forming a terminal block with a desired number of circuits separated by center supports. The terminal block, consisting of a plurality of terminal block connectors, has an end terminal mount attached to a housing of a terminal block connector at an end of the terminal block.

An advantage of the snap on terminal block connector of this disclosure is the ability to form a terminal block with any desired number of snap on terminal block connectors providing any desired number of circuits separated from each other with a barrier.

Another advantage is snap on terminal block connectors that snap together reversibly.

Another advantage is a snap on terminal block connector that is closed backed.

Another advantage is a snap on terminal block connector that has a mounting plate on one side and an end terminal mount on an opposite side allowing the terminal block connector to be mounted to a surface on both sides of the terminal block connector.

Another advantage is a terminal block connector that can be made in any desired size.

DETAILED DESCRIPTION OF THE DISCLOSURE

Figure 1:
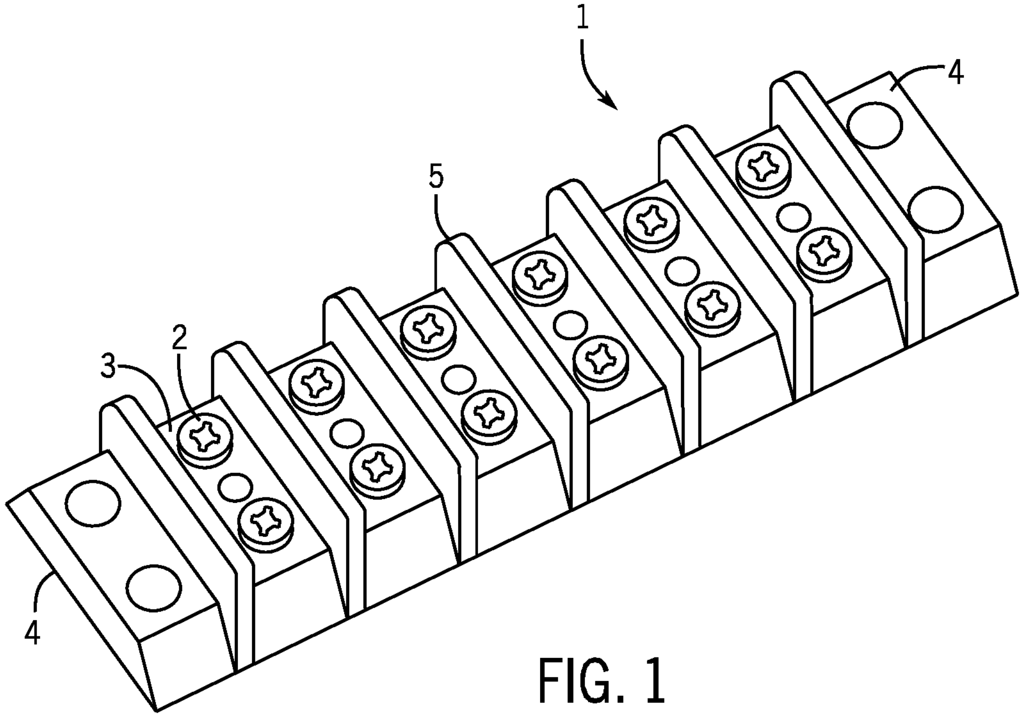
FIG. 1 PRIOR ART
FIG. 1 shows a top, side perspective view of a closed back terminal block of the prior art.
Figure 2:
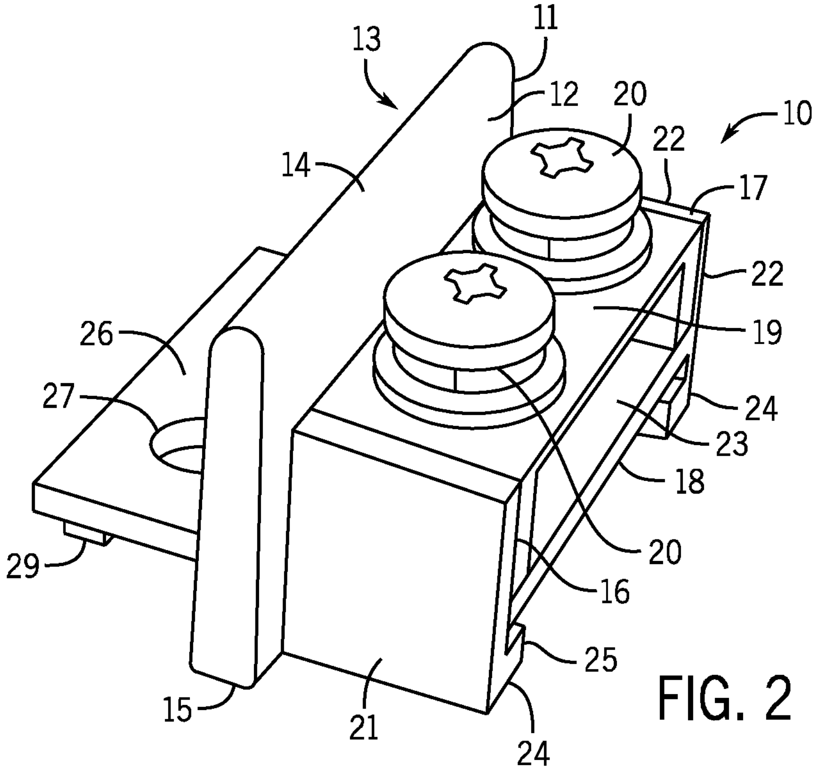
FIG. 2 shows a top, front, left side perspective view of the snap on terminal block connector of this disclosure.
Figure 3:
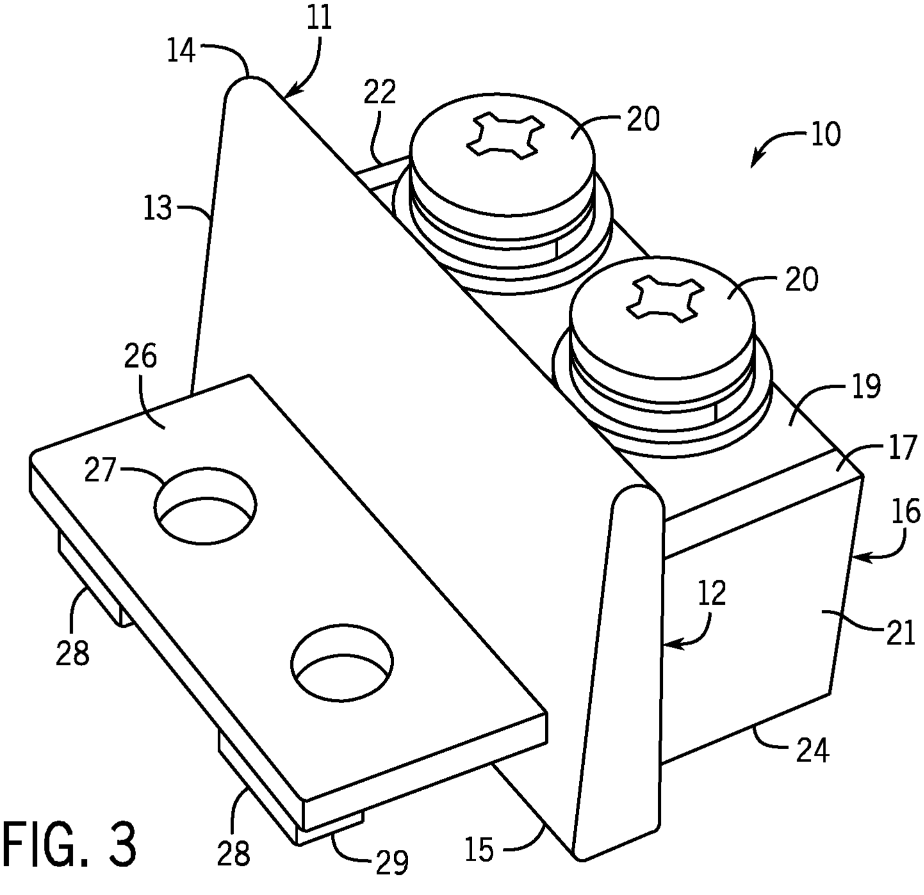
FIG. 3 shows a top, rear, left side perspective view of the snap on terminal block connector.
Figure 4:
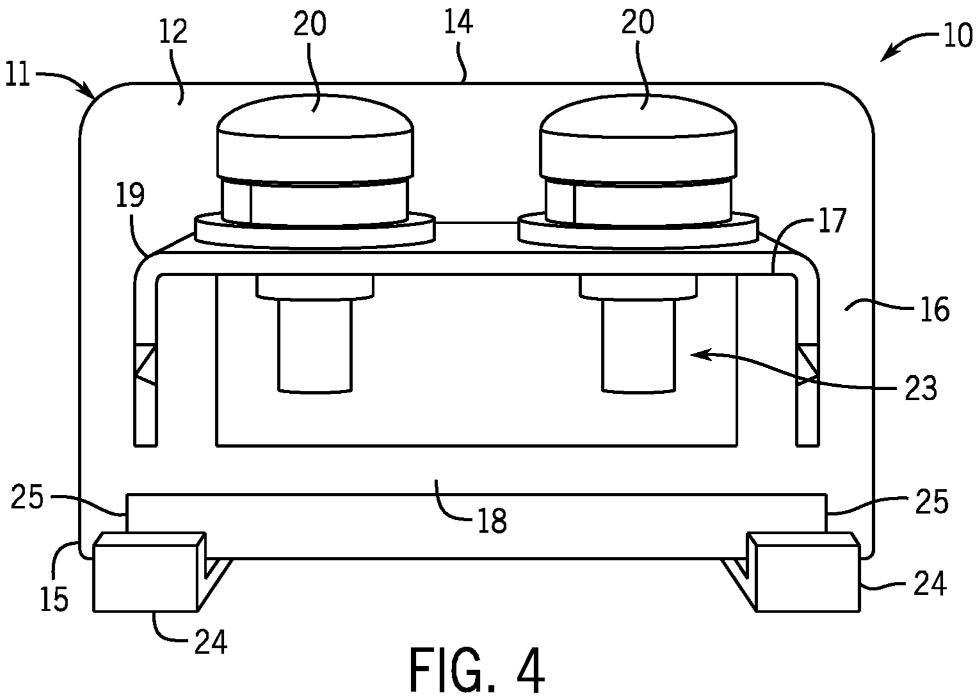
FIG. 4 shows a front view of the snap on terminal block connector.
Figure 5:
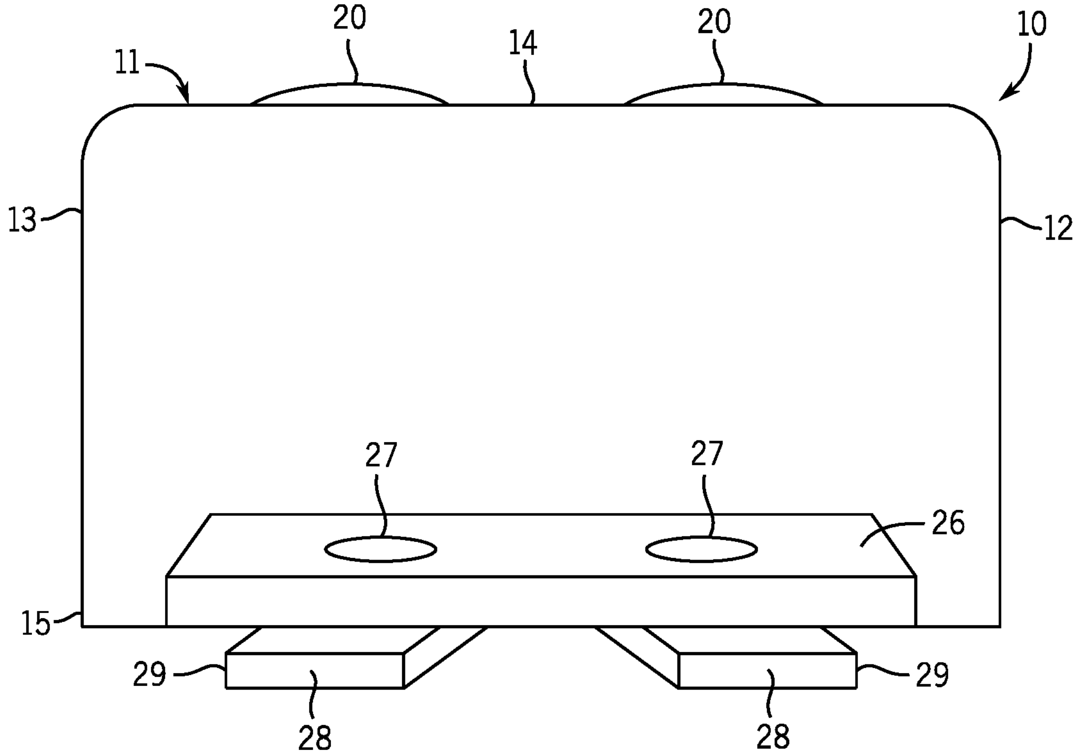
FIG. 5 shows a rear view of the snap on terminal block connector.
Figure 6:
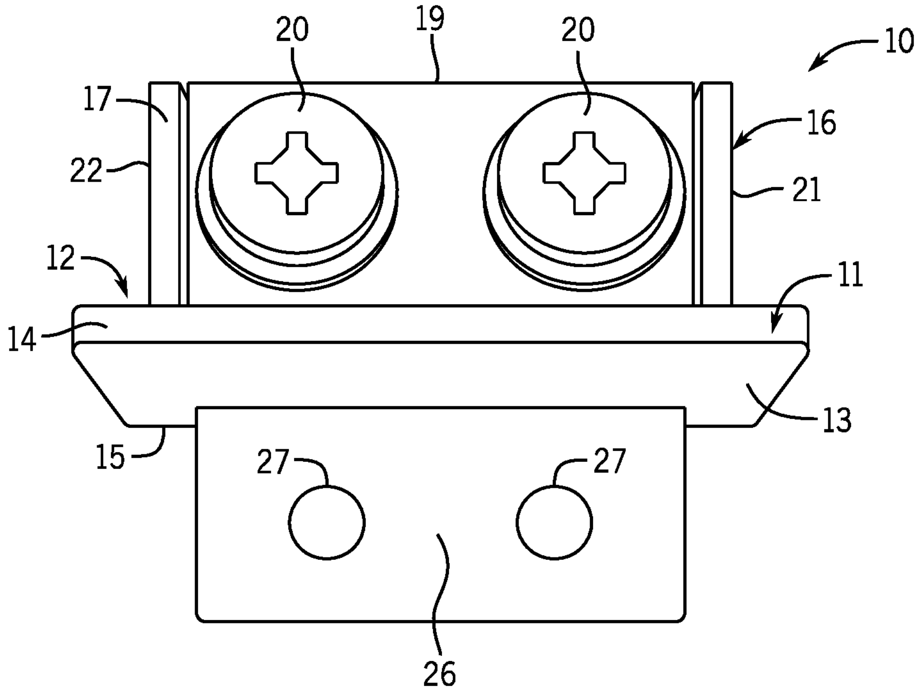
FIG. 6 shows a top view of the snap on terminal block connector.
Figure 7:
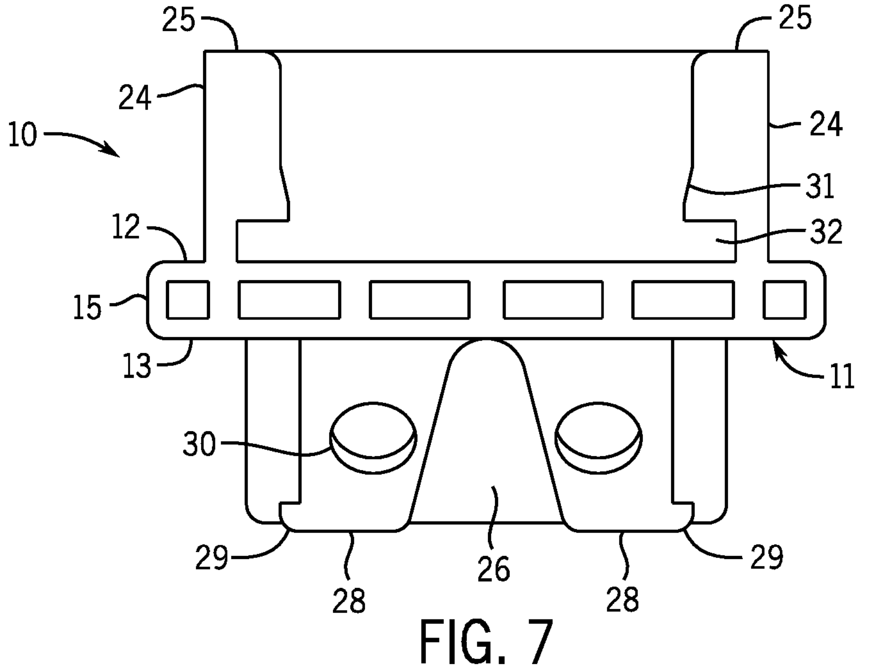
FIG. 7 shows a bottom view of the snap on terminal block connector.

FIG. 2 shows a top, front, left side perspective view of the snap on terminal block connector 10 of this disclosure. The terminal block connector has a center support (barrier) 11 having a first side 12, a second side 13 opposite the first side 12, a top 14 and a bottom 15. The first side 12 has a housing 16 having a top 17 and a bottom 18. The top 17 is a metal electrically conductive plate 19 having two metal screws 20 forming a circuit. The housing 16 has a first side 21, a second side 22 opposite the first side, and an interior 23. The bottom end 18 of the housing 16 has a guide rail 24 on each side. Each guide rail 24 has a guide channel 25. The second side 13 of the center support 11 has a mounting plate 26 having holes 27 for mounting the terminal block connector 10 to a surface. FIG. 3 shows a top, rear, left side perspective view of the snap on terminal block connector further showing locking arms 28, each having a locking hook 29. FIG. 4 shows a front view of the snap on terminal block connector 10, FIG. 5 shows a rear view of the snap on terminal block connector 10, and FIG. 6 shows a top view of the snap on terminal block connector 10. FIG. 7 shows a bottom view of the snap on terminal block connector 10, further showing that the guide rails 24 have a widened portion 31 near the center support 11 and form locking slots 32 at the bottom 15 of the center support 11. The locking arms 28 are flexible vertically and horizontally.

Figure 8:
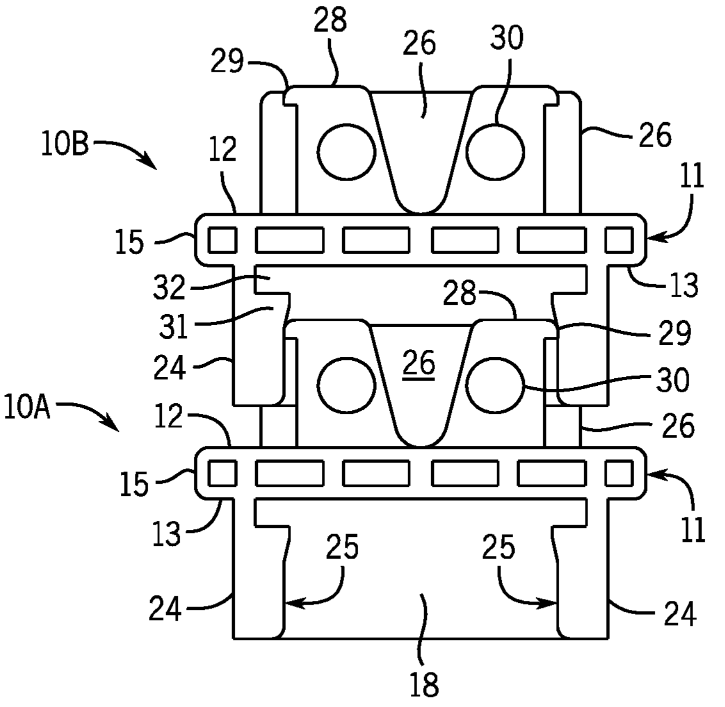
FIG. 8 shows a bottom view of two snap on terminal block connectors in the process of being connected (snapped) together.
Figure 9:
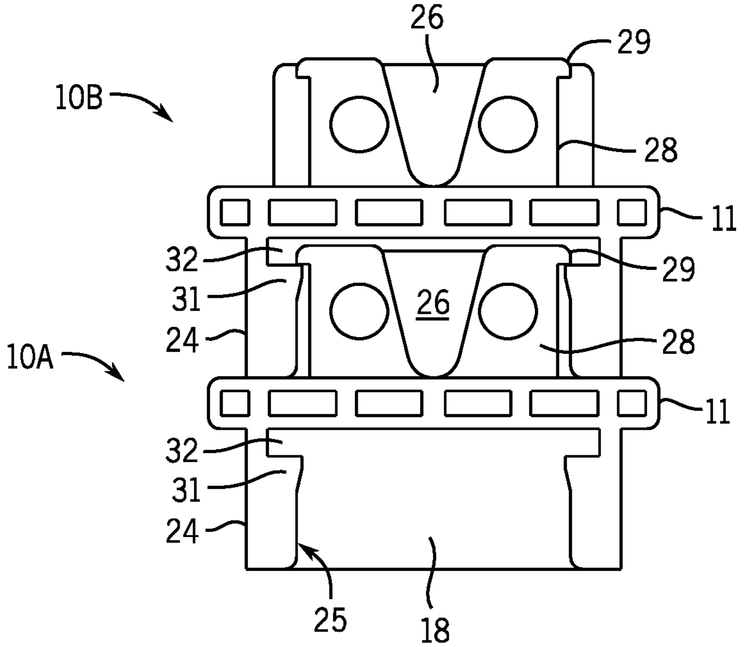
FIG. 9 shows a bottom view of two snap on terminal block connectors connected (snapped) together.
Figure 10:
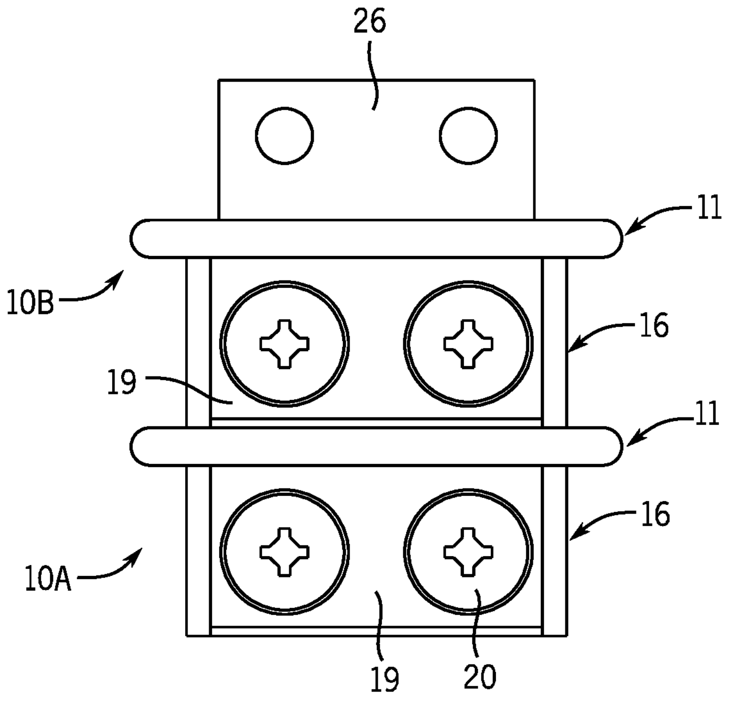
FIG. 10 shows a top view of two snap on terminal block connectors connected together.

FIG. 8 shows a bottom view of two snap on terminal block connectors, 10A and 10B, in the process of being connected (snapped) together. Mounting plate 26 of terminal block connector 10A is inserted into the guide rails 24 of terminal block connector 10B. Locking hooks 29 of terminal block connector 10A engage the edges of the guide rails 24 terminal block connector 10B. As the mounting plate 26 of terminal block connector 10A is pushed towards the center support 11 of terminal block connector 10B hooks 29 of terminal block connector 10A engage the widened portions 31 of the guide rails 24 of terminal block connector 10B causing the locking arms 28 of terminal block connector 10A to be pushed (compressed) towards each other. FIG. 9 shows a bottom view of two snap on terminal block connectors 10A and 10B connected (snapped) together. As the mounting plate 26 of terminal block connector 10A is pushed further towards the center support 11 of terminal block connector 10B, the locking arms 28 of terminal block connector 10A uncompress as the locking hooks 29 of the terminal block connector 10A enter the locking slots 32 of terminal block connector 10B and hook over the ends of the widened portions 31 of the guide rails 24 of terminal block connector 10B. In this configuration, terminal block connector 10A is locked to terminal block connector 10B. Terminal block connector 10A may be unlocked from terminal block connector 10B by compressing the locking arms 28 of terminal block connector 10A together or lifting them above the widened portions 31 of the of the guide rails 24 of terminal block connector 10B. FIG. 10 shows a top view of the two snap on terminal block connectors 10A and 10B connected together. Terminal block connector 10B has a mounting plate 26 but terminal block connector 10A does not.

Figure 11:
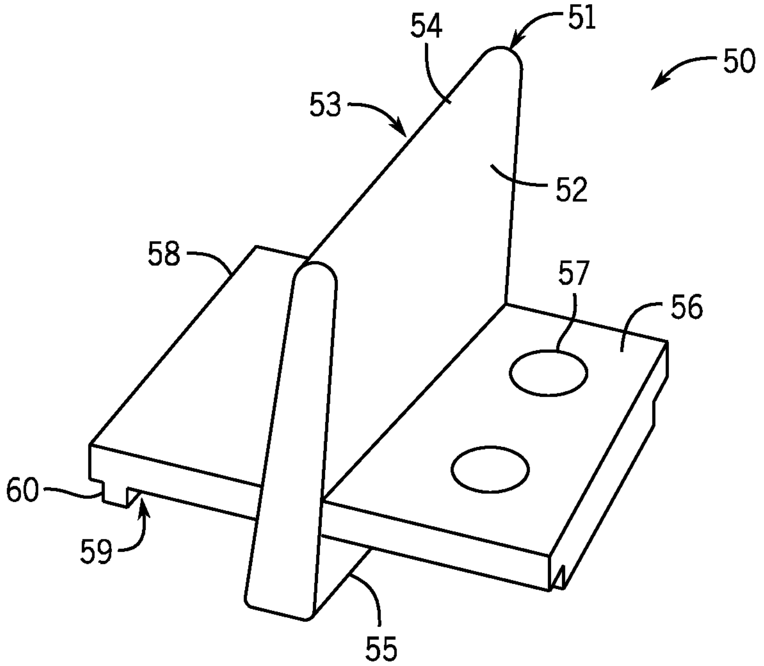
FIG. 11 shows top, front, left side perspective view of a snap on end terminal mount for a terminal end of the snap on terminal block connector.
Figure 12:
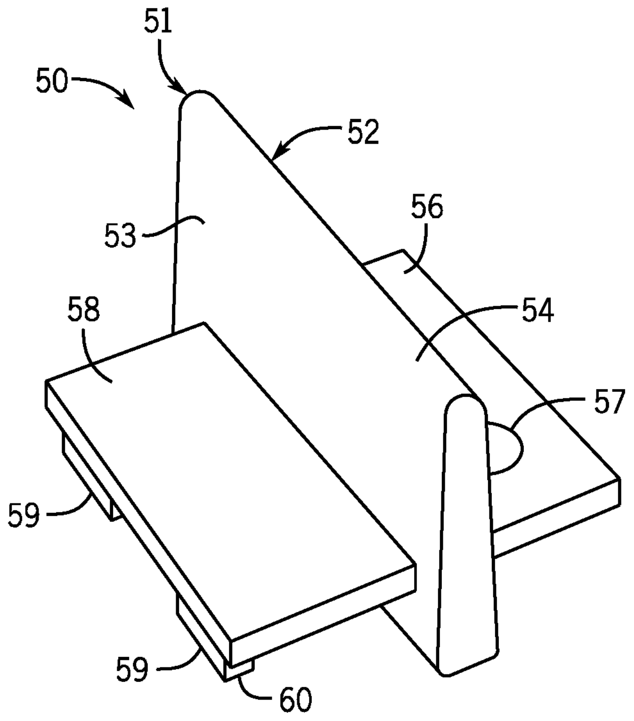
FIG. 12 shows a top, rear, left side perspective view of the end terminal mount.
Figure 13:
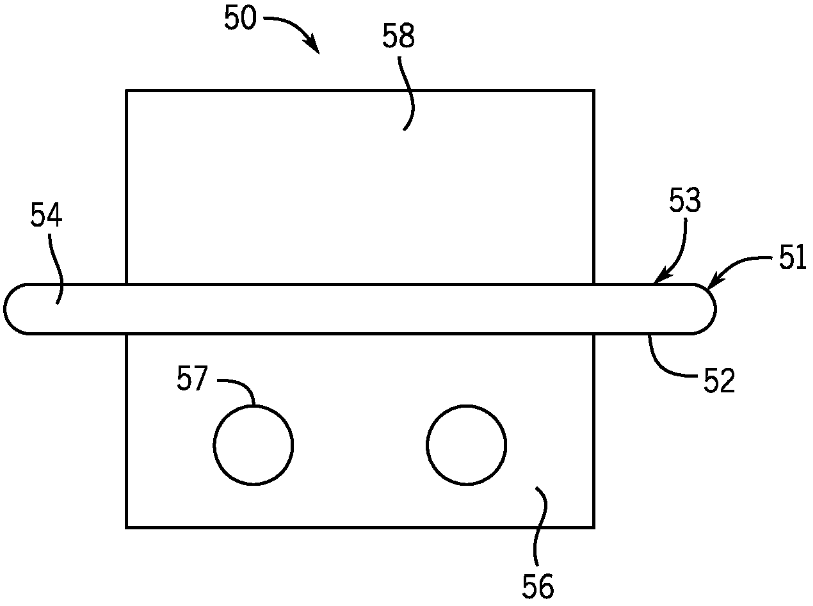
FIG. 13 shows a top view of the end terminal mount.
Figure 14:
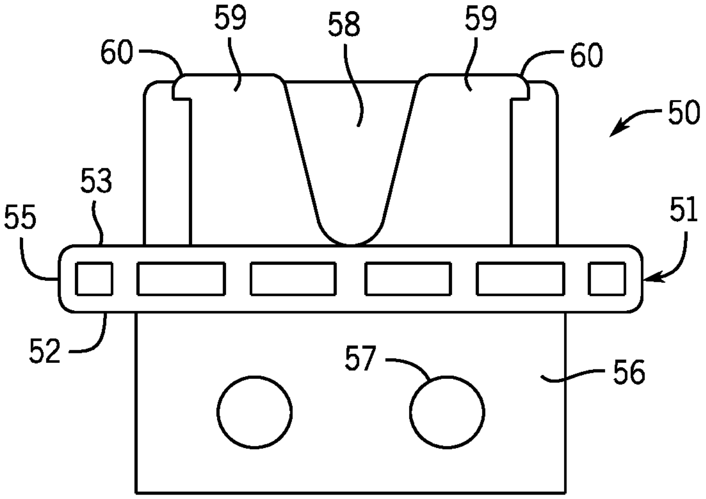
FIG. 14 shows a bottom view of the end terminal mount.

FIG. 11 shows top, front, left side perspective view of a snap on end terminal mount 50 for a terminal end of the snap on terminal block connector 10A as shown, for example, in FIG. 10. The snap on end terminal mount 50 has a center support barrier 51 having the first side 52 and a second side 53 opposite the first side 52. The center support 51 as a top 54, a bottom 55, a mounting plate 56, and a guide plate 58. The mounting plate 56 has mounting holes 57. The guide plate 58 has locking arms 59 and locking hooks 60. FIG. 12 shows a top, rear, left side perspective view of the end terminal mount 50. FIG. 13 shows a top view of the end terminal mount 50. FIG. 14 shows a bottom view of the end terminal mount 50.

Figure 15:
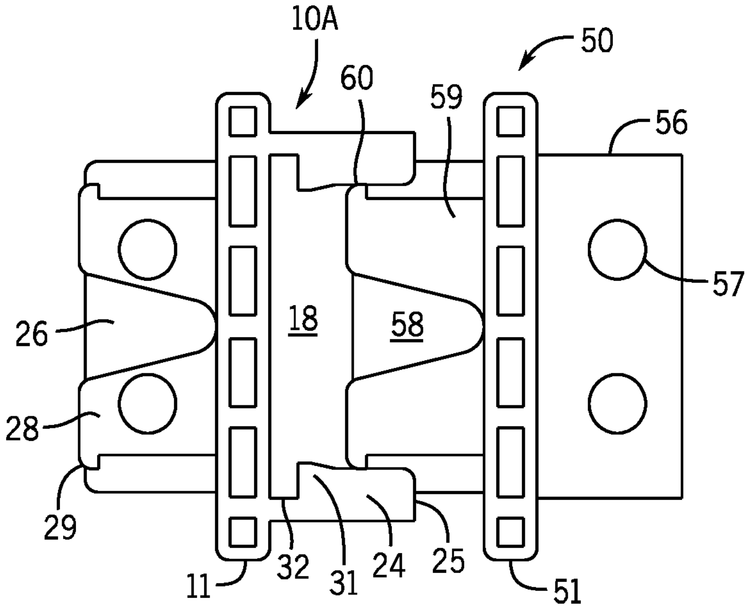
FIG. 15 shows a bottom view of a snap on terminal block connector and an end terminal mount in the process of being connected together.
Figure 16:
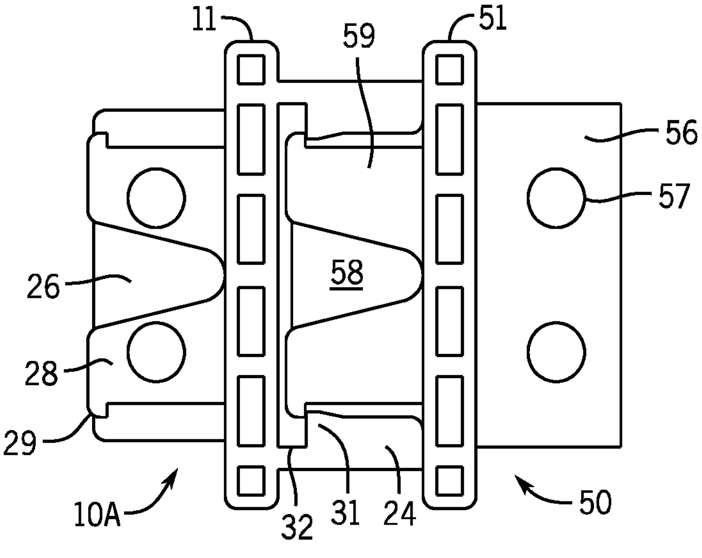
FIG. 16 shows a bottom view of a snap on terminal block connector and an end terminal mount connected together.

FIG. 15 shows a bottom view of a snap on terminal block connector 10A and an end terminal mount 50 in the process of being connected (snapped) together. Mounting plate 58 of end terminal mount 50 is inserted into the guide rails 24 of terminal block connector 10A. Locking hooks 60 of end terminal mount 50 engage the edges of the guide rails 24 terminal block connector 10A. As the mounting plate 58 of end terminal mount 50 is pushed towards the center support 11 of terminal block connector 10A hooks 60 of end terminal mount 50 engage the widened portions 31 of the guide rails 24 of terminal block connector 10A causing the locking arms 59 of end terminal mount 50 to be pushed (compressed) towards each other. FIG. 16 shows a bottom view of a snap on terminal block connector 10A and an end terminal mount 50 connected (snapped) together. As the mounting plate 58 of of end terminal mount 50 is pushed further towards the center support 11 of terminal block connector 10A, the locking arms 59 of end terminal mount 50 uncompress as the locking hooks 60 of the of end terminal mount 50 enter the locking slots 32 of terminal block connector 10A and hook over the ends of the widened portions 31 of the guide rails 24 of terminal block connector 10A. In this configuration, the end terminal mount 50 is locked to terminal block connector 10A. The end terminal mount 50 may be unlocked from terminal block connector 10A by compressing the locking arms 59 of end terminal mount 50 together or lifting them above the widened portions 31 of the guide rails 24 of terminal block connector 10A.

Figure 17:
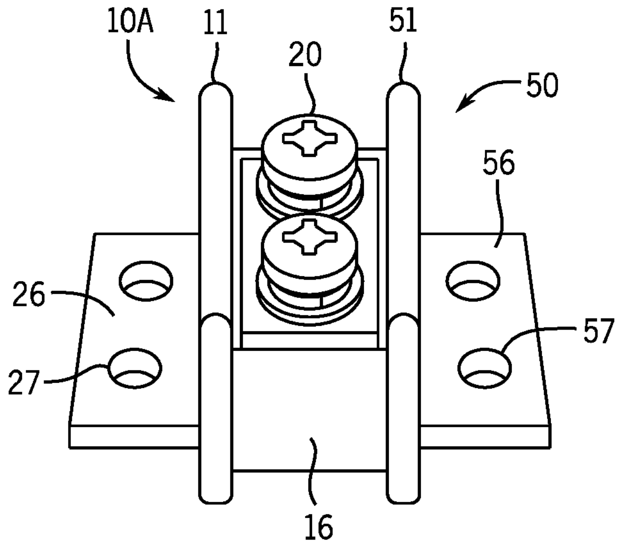
FIG. 17 shows a top view of a snap on terminal block connector and an end terminal mount connected together.
Figure 18:
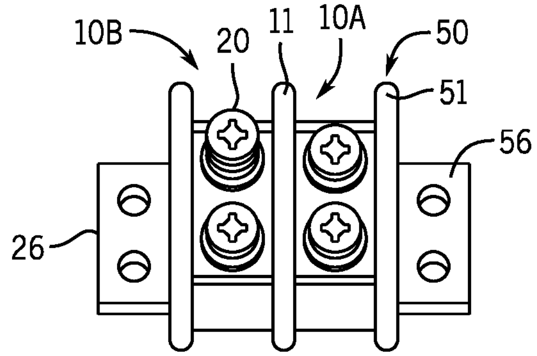
FIG. 18 shows a top view of an exemplary terminal block of this disclosure having two terminal block connectors and an end terminal mount.
Figure 19:
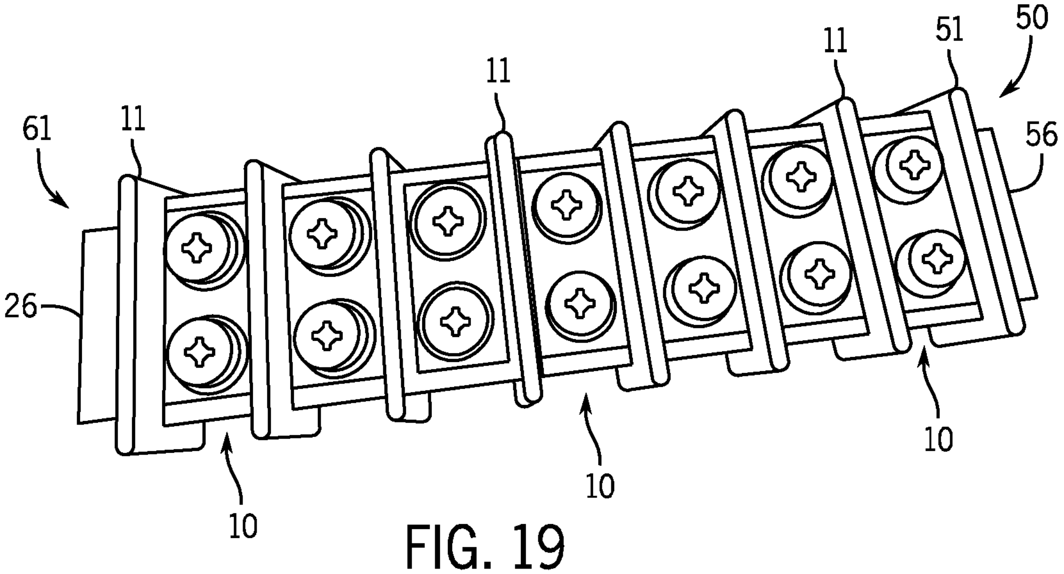
FIG. 19 shows a top view of an exemplary terminal block of this disclosure having seven terminal block connectors and an end terminal mount.

FIG. 17 shows, for example, a top view of a snap on terminal block connector 10A and an end terminal mount 50 connected together. The end terminal mount 50 is connected to the housing 16 of terminal block connector 10A FIG. 18 shows, for example, two snap on terminal block connectors 10A and 10B, as shown in FIG. 10, connected together with a mounting plate 26 on a first end and an end terminal mount 50 connected at a second opposite end to the housing 16 of terminal block connector 10A. FIG. 19 shows, for example, a top view of a terminal block 61 of this disclosure having seven terminal block connectors 10, with a mounting plate 26 on a first end and an end terminal mount 50 connected at a second opposite end. The terminal block 61 may have as many terminal block connectors 10 as desired with each circuit of each terminal block connector 10 separated from adjacent circuits with a center support (barrier) 11.

The foregoing description illustrates and describes the system and method of the disclosure. Additionally, the disclosure shows and describes only the preferred embodiments but as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular application or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above to explain the nature of this invention may be made by those skilled in the art without departing from the principle and scope of the invention as recited in the following claims.

What is claimed is:

1. A terminal block connector, comprising:

a) a center support having a first side, a second side opposite the first side, a top and a bottom;

b) the first side of the center support has a housing having a top and a bottom with one or more metal connectors on the top of the housing and guide rails beneath the bottom of the housing, each guide rail having a channel and a locking slot; and c) the second side of the center support has a mounting plate near the bottom of the center support, with locking arms extending from a bottom of the second side of the center support and below the mounting plate, wherein free ends of locking arms have locking hooks, and wherein the mounting plate is insertable in guide rails of another terminal block connector and the locking hooks are constructed to insert into locking slots of the another terminal block connector and to lock the terminal block connector to the another terminal block connector.

2. The terminal block connector of claim 1 wherein ends of the guide rails near the locking slots are widened.

3. The terminal block connector of claim 1 wherein the locking slots are at the bottom of the center support.

4. The terminal block connector of claim 1 wherein the locking arms are flexible horizontally and vertically.

5. A terminal block, comprising a plurality of terminal block connectors of claim 1, wherein the plurality of terminal block connectors are connected together with the locking hooks and the locking slots of each terminal block connector of the plurality of terminal block connectors, thereby forming a terminal block having a desired number of terminal block connectors separated by center supports.

6. The terminal block of claim 5 wherein the terminal block has an end terminal mount attached to a housing of one of the plurality of terminal block connectors at an end of the terminal block.

7. The terminal block connector of claim 1 wherein an end terminal mount is connected to the housing of the terminal block connector.

8. The terminal block connector of claim 7 wherein the end terminal mount comprises:

a) a center support having a first side, a second side opposite the first side, a top and a bottom;

b) the first side of the center support has a mounting plate; and c) the second side of the center support has a guide plate near the bottom of the center support, with locking arms extending from a bottom of the second side of the center support and below the bottom of the mounting plate, wherein free ends of locking arms of the end terminal mount have locking hooks, wherein the guide plate is insertable in guide rails of the terminal block connector and locking hooks of the end terminal mount are constructed to insert into locking slots of the terminal block connector and to lock the end terminal mount to the terminal block connector.

9. The terminal block connector of claim 1 wherein the locking hooks lock the terminal block connector to the another terminal block connector reversibly.

10. A terminal block, comprising:

a terminal block connector comprising:

a) a center support having a first side, a second side opposite the first side, a top and a bottom;

b) the first side of the center support has a housing having a top and a bottom with one or more metal connectors on the top of the housing and guide rails beneath the bottom of the housing, each guide rail having a channel and a locking slot; and c) the second side of the center support has a mounting plate near the bottom of the center support, with locking arms extending from a bottom of the second side of the center support and below the mounting plate, wherein free ends of locking arms have locking hooks, wherein the mounting plate is insertable in guide rails of another terminal block connector and the locking hooks are constructed to insert into locking slots of the another terminal block connector and to lock the terminal block connector to the another terminal block connector, wherein an end terminal mount is connected to the housing of the terminal block connector, and wherein the end terminal mount comprises:

a) a center support having a first side, a second side opposite the first side, a top and a bottom;

b) the first side of the center support has a mounting plate; and c) the second side of the center support has a guide plate near the bottom of the center support, with locking arms extending from a bottom of the second side of the center support and below the bottom of the mounting plate, wherein free ends of locking arms of the end terminal mount have locking hooks and wherein the guide plate is insertable in the guide rails of the terminal block connector and locking hooks of the end terminal mount are constructed to insert into the locking slots of the terminal block connector and to lock the end terminal mount to the terminal block connector.

11. The terminal block of claim 10 wherein ends of the guide rails near the locking slots are widened.

12. The terminal block of claim 10 wherein the locking slots are at the bottom of the center support.

13. The terminal block of claim 10 wherein all locking arms are flexible horizontally and vertically.

14. The terminal block of claim 10 wherein a plurality of terminal block connectors are connected together with the locking hooks and the locking slots of each terminal block connector of the plurality of terminal block connectors, thereby forming a terminal block having a desired number of terminal block connectors separated by center supports.

15. The terminal block of claim 10 wherein locking hooks of the terminal block connector lock the terminal block connector to the another terminal block connector reversibly.

16. A terminal block, comprising:

a terminal block connector comprising:

a) a center support having a first side, a second side opposite the first side, a top and a bottom;

b) the first side of the center support has a housing having a top and a bottom with one or more metal connectors on the top of the housing and guide rails beneath the bottom of the housing, each guide rail having a channel and a locking slot; and c) the second side of the center support has a mounting plate near the bottom of the center support, with locking arms extending from a bottom of the second side of the center support and below the mounting plate, wherein free ends of locking arms have locking hooks, and wherein the mounting plate is insertable in guide rails of another terminal block connector and the locking hooks are constructed to insert into locking slots of the another terminal block connector and to lock the terminal block connector to the another terminal block connector, wherein a plurality of terminal block connectors are connected together with the locking hooks and the locking slots of each terminal block connector of the plurality of terminal block connectors, thereby forming a terminal block having a desired number of terminal block connectors separated by center supports, wherein the terminal block has an end terminal mount attached to a housing of a terminal block connector at an end of the terminal block, wherein the end terminal mount comprises:

a) a center support having a first side, a second side opposite the first side, a top and a bottom;

b) the first side of the center support has a mounting plate; and c) the second side of the center support has a guide plate near the bottom of the center support, with locking arms extending from a bottom of the second side of the center support and below the bottom of the mounting plate, wherein free ends of the locking arms of the end terminal mount have locking hooks, wherein the guide plate is insertable in guide rails of the terminal block connector and locking hooks of the end terminal mount are constructed to insert into locking slots of the terminal block connector and to lock the end terminal mount to the terminal block connector.

17. The terminal block of claim 16 wherein ends of guide rails near locking slots are widened.

18. The terminal block of claim 16 wherein locking slots are at the bottom of the center support of the terminal block connector.

19. The terminal block of claim 16 wherein all locking arms are flexible horizontally and vertically.

20. The terminal block of claim 16 wherein locking hooks of the terminal block connector lock the terminal block connector to the another terminal block connector reversibly.

* * * * *